United States Patent [19]
Hosoe et al.

[11] 3,961,178
[45] June 1, 1976

[54] IMAGE SHARPNESS DETECTING SYSTEM AND APPARATUS UTILIZING THE SAME

[75] Inventors: Kazuya Hosoe; Hiroshi Aizawa, both of Machida; Seiichi Matsumoto, Yokohama; Hideo Yokota, Tokyo, all of Japan

[73] Assignee: Canon Kabushiki Kaisha, Tokyo, Japan

[22] Filed: Oct. 18, 1974

[21] Appl. No.: 515,849

[30] Foreign Application Priority Data
Oct. 23, 1973  Japan.............................. 48-119281

[52] U.S. Cl. ........................ 250/201; 250/211 R; 356/123; 354/25
[51] Int. Cl.² ...................... G01J 1/20; H01J 39/12
[58] Field of Search ............ 250/211 R, 211 K, 212, 250/216, 201; 354/25, 31; 356/123

[56] References Cited
UNITED STATES PATENTS

| | | | |
|---|---|---|---|
| 2,879,405 | 3/1959 | Pankove | 250/211 K |
| 3,193,686 | 7/1965 | Heinz | 250/211 K X |
| 3,222,531 | 12/1965 | Morrison | 250/211 K |
| 3,649,840 | 3/1972 | Thorn et al. | 250/211 K X |
| 3,830,571 | 8/1974 | Imai et al. | 250/201 X |
| 3,875,401 | 4/1975 | Stauffer | 250/201 |

*Primary Examiner*—Walter Stolwein
*Attorney, Agent, or Firm*—Toren, McGeady and Stanger

[57] ABSTRACT

An image sharpness detecting system employing two photoconductive cells of different geometry which permits detection of an optimum degree of sharpness of an image formed thereon regardless of variation in the direction of light distribution of the image relative to the electrodes of the cells. Differences between light response characteristics of these two cells due to the different geometry thereof are compensated for by providing optical means such as filter arranged between the cells, whereby the system is made accurately and reliably responsive to variation of light distribution even at low total light levels.

16 Claims, 32 Drawing Figures

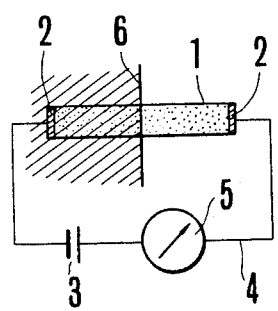
FIG. 1A
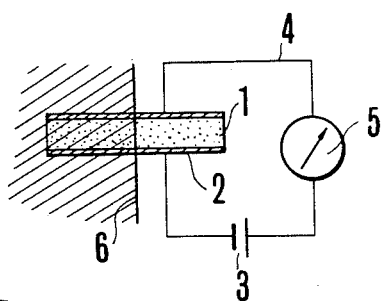
FIG. 1B
FIG. 2
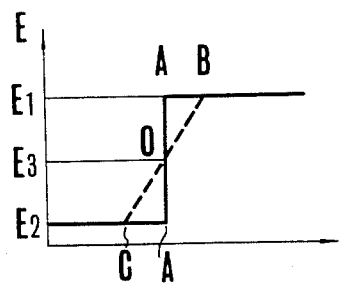
FIG. 3A
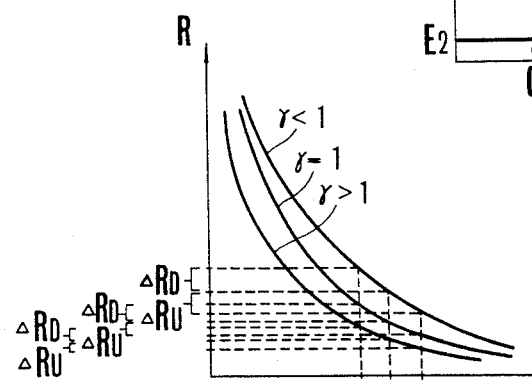
FIG. 3B
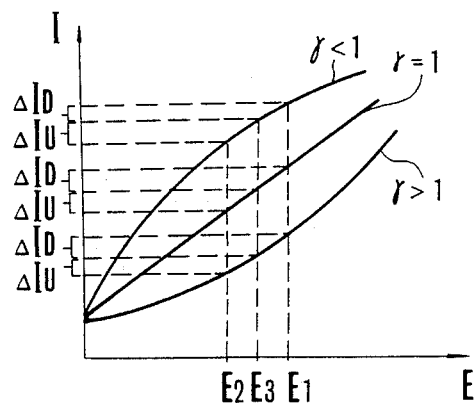

FIG. 9A  FIG. 9B
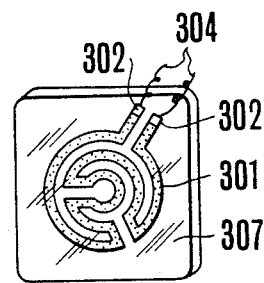
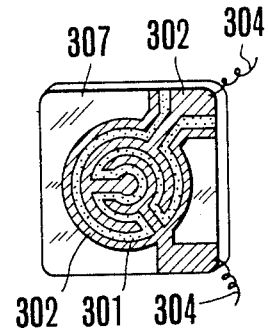
FIG. 10A  FIG. 10B  FIG. 10C
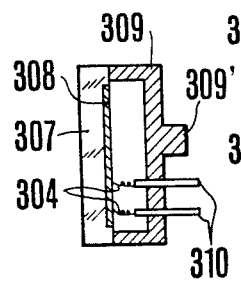
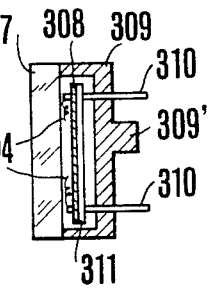
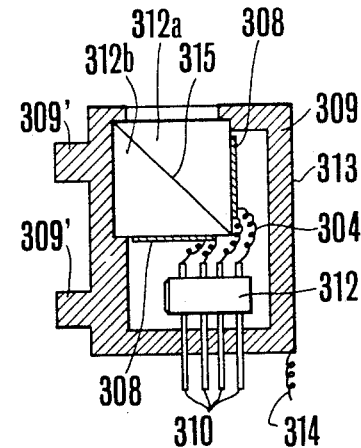
FIG. 11
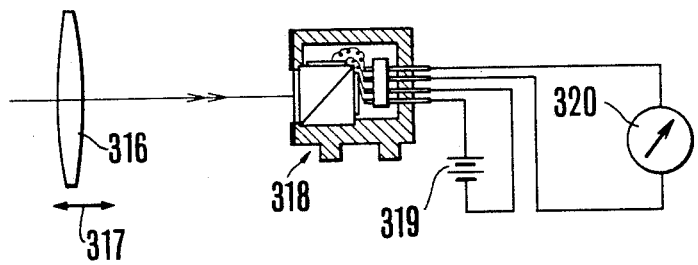

IMAGE SHARPNESS DETECTING SYSTEM AND APPARATUS UTILIZING THE SAME

BACKGROUND OF THE INVENTION

This invention relates to an image sharpness detecting system for automatic focus adjustment and apparatus utilizing the same suitable for use in optical instruments such as cameras.

The system for detecting an optimum degree of sharpness of an image by utilizing the non-linearity of photoelectric effect prominent in photoconductive substance such as cadmium sulfide and cadmium selenide is already known, for example, in Japanese Patent Publications Nos. 39-29120, 41-14500 and 44-9501. The aforesaid non-linearity of photoelectric effect of photoconductive substance is a phenomenon that as the degree of sharpness of an image formed on the surface of the photoconductive substance is increased, the electrical response and particularly the resistance of the photoconductive surface is increased or decreased. This phenomenon is based on the fact that the amount of incident light per an elementary area of the photoconductive surface varies with variation in sharpness of the image, and the distribution of such incident light over all the elementary areas remarkably differs when the degree of image sharpness reaches a maximum value. In other words, the difference between light intensities of two adjacent elementary areas is largest when the sharpest image is formed, causing production of a large difference between the resistances of the adjacent elementary areas of the photoconductive surface. Most of the objects which may be usually encountered when photographing, however, have very irregular brightness distributions, and further the luminance ratio between two adjacent elementary areas or the relative contrast in the image is not always sufficiently high. Consequently, with the image-receiving surface of a photoconductive cell of a geometry which has been used in the prior art, it is difficult to accurately detect an optimum degree of sharpness of the image formed thereon owing to insufficient action of the photoconductive effect.

The structure of a real image projected onto the photoconductive surface from a usual object is complicated as including various luminance patterns so that the photoconductive surface of conventional geometry cannot sense the sharpness of all of these patterns but the sharpness of those portions which assume certain angular positions with respect to the electrodes of the photoconductive cell. For example, an optimum degree of sharpness of that portion of the projected image which is perpendicular or parallel to the electrodes of a photoconductive cell cannot be detected at all. On this account, it is necessary to impart a particular geometry to the photoconductive cell such that it can sense the sharpness of an image which may assume any angular position relative to the electrodes.

Another drawback of the prior art image sharpness detecting system is that when the total light intensity of the image is relatively low, an optimum degree of sharpness of an image cannot be detected accurately and reliably. This is because the electrical response of the photoconductive cell is small at the low light levels, and because the output of the photoconductive cell varies slowly at the point of sharpest focus of the image.

SUMMARY OF THE INVENTION

An object of the invention is to overcome the above-mentioned conventional drawbacks and to provide an image sharpness detecting system cooperating with an image-forming optical system to accurately and reliably detect an optimum degree of sharpness of an image projected thereby from an object, and a detecting apparatus utilizing such system.

Another object of the invention is to provide an image sharpness detecting system employing two photoconductive cells of different geometry which permits detection of an optimum degree of sharpness of an image formed thereon regardless of variation in the angular position of the image relative to the electrodes of the cells, and a detecting apparatus utilizing such system.

Still another object of the invention is to provide an image sharpness detecting system employing two photoconductive cells of different geometry in combination with optical system for compensating differences in the light response characteristics of the two cells due to the difference of geometry, whereby the system is made accurately and reliably responsive to the change in light distribution of the image even at low light levels, and a detecting apparatus utilizing such system.

A further object of the invention is to provide an image sharpness detecting system employing two photoconductive cells of different characteristics responsive to light arranged on a common optical axis of the image-forming system to overcome the above-mentioned conventional drawbacks and a detecting apparatus utilizing such system.

A further more object of the invention is to provide an image sharpness detecting system employing two photoconductive cells of different characteristics responsive to light arranged either on a common optical axis of the image-forming system, or behind respective faces of a beam-splitter positioned on the optical axis, the two photoconductive cells being mounted as a unit within a housing, and a detecting apparatus utilizing the system.

Other objects and features of the invention will become apparent from the following detained description taken in conjunction with the accompanying drawings in which:

BRIEF DESCRIPTION OF THE DRAWINGS

FIG. 1A is a schematic elevational view illustrating the principle of construction of a series type light-to-electric signal converter adapted for use in an image sharpness detecting system of the invention in an operative condition.

FIG. 1B is a schematic elevational view illustrating the principle of construction of a parallel type light-to-electric signal converter adapted for use in an image sharpness detecting system of the invention in an operative condition.

FIG. 2 is a graph depicting the variation of light distribution of an image formed on the surface of a photoconductive cell in the converters of FIGS. 1A and 1B.

FIG. 3A is a graph depicting the variation with illumination of a resistance of the photoconductive cell in the converter of FIG. 1A.

FIG. 3B is a graph depicting the variation with illumination of the resistance of the photoconductive cell in the converter of FIG. 1B.

FIGS. 9(a) and 9(b) are enlarged perspective views of a further example of the embodiment of the photoconductive cells.

FIGS. 10(a), 10(b) and 10(c) are schematic enlarged sectional views of the photoconductive cells of FIGS. 7, 8 or 9 mounted as a unit within a housing.

FIG. 11 is a schematic partly sectional, partly elevational view of the image sharpness detecting system employing the photoconductive cell unit of FIG. 10(c) in accordance with the invention cooperating with an image-forming optical system.

DESCRIPTION OF THE PREFERRED EMBODIMENTS

Figure 4A:
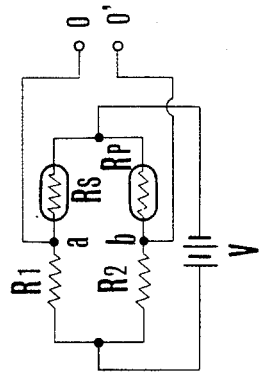
FIG. 4A is an enlarged elevational view of a practical example of one embodiment of the photoconductive cell in the series type converter of FIG. 1A in accordance with the invention.

A number of embodiments of the image sharpness detecting system in accordance with the present invention and apparatus utilizing the same will be described in conjunction with the drawings.

The principle of construction of light-to-electric signal converter suitable for use in the system of the present invention are schematically illustrated in FIGS. 1A and 1B, wherein FIG. 1A illustrates one type of light-to-electric signal converter having a photoconductive cell of which the image-receiving surface 1 is rectangular, the length of the shorter sides being far shorter than the length of the longer sides, and having electrodes 2 contacting the respective shorter sides and connected by leads 4 to a battery 3 through an electrical indicator 5, this converter being hereinafter referred to as "series type converter", while FIG. 1B illustrates another type of light-to-electric signal converter having a photoconductive cell of which the image-receiving surface 1 is rectangular, the length of the shorter sides being a far shorter than that of the longer sides, and having electrodes 2 contacting the respective longer sides and connected by leads 4 to a battery 3 through an electrical indicator 5, this converter being hereinafter referred to as "parallel type converter". A real image of an object formed on the photoconductive surface 1 by a not shown image-forming system also is illustrated as having a light distribution which abruptly changes at a line 6.

As the length of the longer sides of the photoconductive surface 1 is extremely increased as compared with the shorter sides, the probability of encountering images of which the brightness boundaries 6 are not parallel to the electrodes of the cells as shown in FIG. 1A is increased in the series type converter, and also the probability of encountering images of which the brightness boundaries 6 are not perpendicular to the electrodes as shown in FIG. 1B is increased in the parallel type converter.

Consideration will now be given to the difference between light response characteristics of these two type converters of widely different electrode arrangement with respect to the variation particularly in resistance or conductance produced by the variation in light distribution due to the variation in degree of sharpness of the image. Two typical examples of the light distribution of an image on the photoconductive surface are illustrated schematically in FIG. 2, wherein the ordinate is in light intensity and the abscissa is in distance in a direction perpendicular to the boundary line 6, the solid line curve indicating a light distribution under conditions prevailing when a sharp image is formed on the photoconductive surface, and the dashed line curve indicating a light distribution under conditions prevailing when an unsharp image is formed on the photoconductive surface 1.

In general, electrical characteristics of a photoconductive cell is represented with respect to the relation between the resistance R and the incident light intensity E by the following formula $$R = KE^{-\gamma} \qquad (1)$$

wherein K and $\gamma$ are constants inherent to the given photoconductive cell. Hence, upon application of a predetermined voltage across the photoconductive cell, the current flowing through the photoconductive cell may be expressed by the following formula $$I = K'E^{\gamma} \qquad (2)$$

wherein K' is a constant dependent upon the characteristics inherent to the photoconductive cell and upon the voltage applied thereacross.

The formula (1) relating resistance R to light intensity E and the formula (2) relating current I to light intensity E are graphically illustrated in terms of exponents, i.e., $\gamma < 1$, $R = 1$ and $\gamma > 1$, in FIGS. 3A and 3B respectively. Assuming now that a change in light distribution on the photoconductive surface is produced in the vicinity of line 6 as from the solid line curve A—A to dashed line curve B–C shown in FIG. 2, the initial light intensity, $E_1$, in the right side vicinity of line 6 is decreased by different amounts with different distances from the line over a distance range AB, while the initial light intensity, $E_2$, in the left side vicinity of line 6 is increased by different amounts with different distances from the line 6 over a distance range AC. In this case, the average light intensity, $E_3$, over the distance range CB may be considered to be $(E_1 + E_2)/2$. Further, the total of the illumination decreases integrated over the distance range AB may be approximated by an illumination decrease from $E_1$ to $E_3$, and the total of the illumination increases integrated over the distance range AC may be approximated by an illumination increase from $E_2$ to $E_3$ provided that the distances AB and AC are negligibly small. On the other hand, by differentiating the equation (1) two times, we obtain the following equation;

$$d^2R/dE^2 = K\gamma(\gamma + 1)E^{-(\gamma+2)} > 0 \qquad (3)$$

It follows from equation (3) that in the case of $\gamma < 1$, an local resistance increase $\Delta R_U$ resulting from the local illumination decrease from $E_1$ to $E_3$ is smaller than a local resistance decrease $\Delta R_D$ resulting from the local illumination increase from $E_2$ to $E_3$, namely, $\Delta R_U < \Delta R_D$. As a result, the algebraical sum of these local resistance changes produced by local illumination changes is negative, so that the overall resistance value of the photoconductive cell 1 is decreased with increase in current. This is true likewise in the cases of $\gamma = 1$ and $\gamma > 1$. It is to be understood that when an optimum degree of sharpness of the image is attained, the resistance of the series type converter reaches a peak value in any cases of the $\gamma$ value.

In the case of the parallel type converter, the situation is more complicated. By differentiating the equation (2) two time, we obtain the following equation $$d^2I/dE^2 = K'\gamma(\gamma-1)E^{\gamma-2} \qquad (4)$$

so that where $\gamma < 1$, $\gamma = 1$, and $\gamma > 1$, the following formulae respectively resulted.

$$d^2I/dE^2 > 0; \; d^2I/dE^2 = 0; \text{ and } d^2I/dE^2 > 0 \qquad (5)$$

It follows that $\Delta I_U > \Delta I_D$ for $\gamma < 1$; $\Delta I_U = \Delta I_D$ for $\gamma = 1$; and $\Delta I_U < \Delta I_D$ for $\gamma = 1$, wherein $\Delta I_U$ is a current increase resulting from the local illumination increase in the distance range AC and $\Delta I_D$ is a current decrease resulting from the local illumination increase in the distance range AB. In other words, where $\gamma < 1$, when an optimum degree of sharpness of the image is attained, the photocurrent flowing through the photoconductive cell 1 is at minimum (the resistance at maximum). Where $\gamma = 1$, the current (resistance) is maintained constant despite of any change in local illumination of the image. Where $\gamma > 1$, when an optimum degree of sharpness of the image is attained, the photocurrent reaches a maximum value (the resistance at minimum).

As is evident from the foregoing discussion that where $\gamma > 1$, the series type converter and the parallel type converter, though both having non-linearity photoconductive effects, behave in inverted manner to each other with respect to the electrical response and particularly to the resistance variation produced by the variation in light distribution resulting from the variation in sharpness of the image. Therefore, as the degree of sharpness of similar images formed respectively on the series type and parallel type converters is increased, the series type converter acquires an increasing resistance value, while the parallel type converter loses an increasing resistance value, thereby the difference between the resistance values of the two type converters is largely increased with a large increase in the sensitivity of the converter assembly to the change in light distribution as compared with a single converter in detecting an optimum degree of sharpness of the image.

Figure 4B:
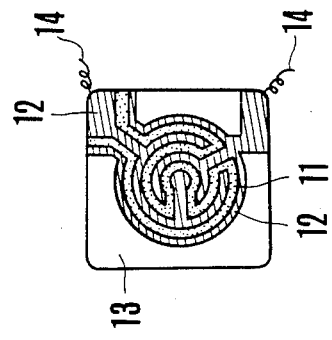
FIG. 4B is an enlarged elevational view of a practical example of the embodiment of the photoconductive cell in the parallel type converter of FIG. 1B in accordance with the present invention.

The present invention in its broader aspects utilizes this phenomenon, comprising a pair of series type and parallel type converters of inverted characteristics with respect to each other arranged to produce an output proportional to the multiplicity of the photoelectric effects due to the inverted characteristics, whereby an optimum degree of sharpness of the image can be accurately detected. One embodiment of the present invention includes first photoconductive means of the series type electrode arrangement and second photoconductive means of the parallel type electrode arrangement shown in FIGS. 4A and 4B respectively, wherein FIG. 4A illustrates a practical example of the geometry of a photoconductive surface 11 configured in such a manner that three concentric equally-spaced rings of equal width from each other are interconnected with each other at suitable positions to establish a single current path with the photoconductive substance, and a pair of electrodes 12 contacting the respective ends of the current path and to which respective leads 14 are connected, the parts 11 and 12 being mounted on an insulated substrate 13, while FIG. 4B illustrates a geometry of a photoconductive surface 11 identical to that in FIG. 4A and geometries of paired electrodes arranged along the current path with the photoconductive material of surface 11, the ends of the electrodes 12 being connected to respective leads 14, and the parts 11 and 12 being mounted on an insulated substrate 13. The geometries of the photoconductive surface 11 shown in FIGS. 4A and 4B are largely different from that of the photoconductive surface 1 shown in FIGS. 1A and 1B, but they are identical in fundamental construction of the current path to each other. Taking into account variety of orientations of the brightness boundaries between adjacent dark and bright areas in a real image of any object which may be usually encountered, a complicated geometry is imparted to the photoconductive surfaces as shown in FIGS. 4A and 4B so as to permit the above-mentioned photoconductive effect to work efficiently in the light-to-electric signal converter. Since various modifications may be made in the geometry of the photoconductive surface, it is intended that the feature of the photoconductive surface shall be interpreted as illustrated.

Seven examples of the image sharpness detecting circuit constructed from a combination of series type and parallel type converters in accordance with the invention are illustrated in FIGS. 5A through 5G, wherein the series type and parallel type converter elements are designated by Rs and Rp respectively.

Figure 5A:
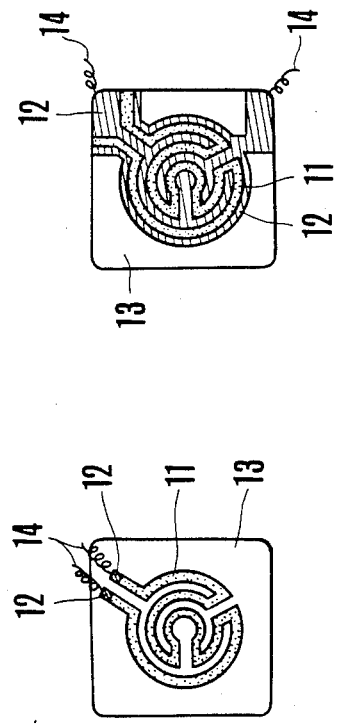
FIGS. 5A through 5G are diagrams of electrical circuitry including the photoconductive cells of FIGS. 4A and 4B suitable for use in the image sharpness detecting system in accordance with the invention.

FIG. 5A illustrates a circuit comprising elements Rs and Rp connected in series to a power source V, so that the potential at the interconnection point, a, between the elements Rs and Rp varies with the relative variation of the resistance values of elements Rs and Rp. In the case of $\gamma > 1$ for element Rp, as the degree of sharpness of similar images on the respective elements Rs and Rp increases, the resistance value of element Rs is increased, but the resistance value of element Rp is decreased, so that the potential of the terminals, a, is increased to a maximum value when an optimum degree of sharpness of the image is attained on each of the elements.

Figure 5B:
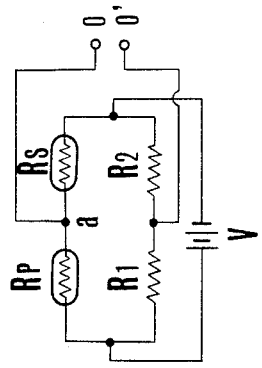

FIG. 5B illustrates a circuit comprising elements Rs and Rp connected in series circuit and a fixed resistor R1 and a variable resistor R2 connected in series circuit, these series circuits being connected in parallel to a power source V to form a Wheatstone bridge circuit. In the case of $\gamma > 1$ for element Rp, as the degree of sharpness of an image on each of elements Rs and Rp is increased, the resistance value Rs is increased, while the resistance value Rp is decreased, so that the potential of the interconnection point, a, between elements Rs and Rp, or a voltage produced between the output terminals, 0 and 0', of the bridge circuit is increased to a maximum value when an optimum degree of sharpness of the image is attained.

Figure 5C:
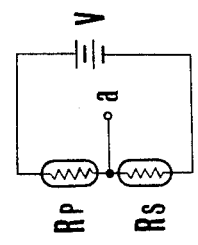

FIG. 5C illustrates a circuit comprising an element Rs and a fixed resistor R1 connected in series circuit and an element Rp and a variable resistor R2 connected in series circuit, these series circuits being connected in parallel with a power source V to form a Wheatstone bridge circuit. In the case of $\gamma > 1$ for the element Rp, when an optimum degree of sharpness of each of the images on the elements Rs and Rp is attained, the potential of an interconnection point, a, between element Rs and resistor R1 reaches a maximum value, while the potential of an interconnection point, b, between element Rp and resistor R2 reaches a minimum value, so that the voltage produced between the output terminals, 0 and 0', of the bridge circuit reaches a maximum value when an optimum degree of sharpness of the image is attained. In the case of $\gamma = 1$ for element Rp, the resistance value of element Rp is independent of the degree of sharpness of the image, but is dependent upon the total light intensity of the image so that as the degree of the sharpness of the image is increased, the potential of point, a, is increased, but the potential of point, b, is maintained constant. Therefore, the ramp of voltage between the output terminals, 0 and 0', resulting from the variation in sharpness of the image is decreased although the voltage reaches a maximum value when an optimum degree of sharpness of the image is attained.

Figure 5E:
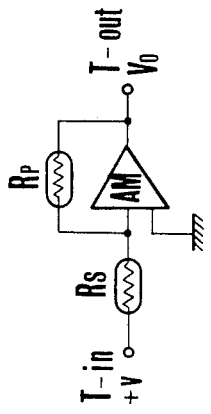
Figure 5G:
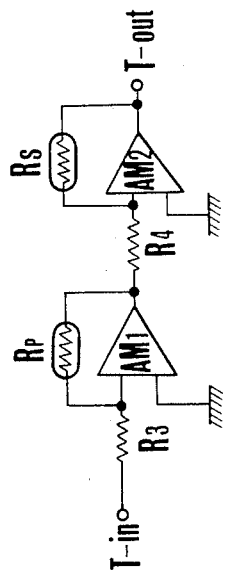
Figure 5D:
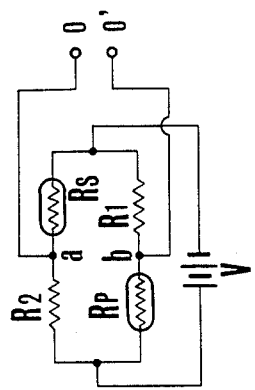

FIG. 5D illustrates a circuit comprising an element Rs and an element Rp of $\gamma > 1$ connected as two opposite arms of a Wheatstone bridge of which other opposite arms are a fixed resistor R1 and a variable resistor R2. A power source V is connected in parallel with the series circuit containing resistor R2 and element Rs and with the series circuit containing element Rp and resistor R1. In this case, as the degree of sharpness of similar images on the elements Rs and Rp is increased, both the resistance values of Rs and Rp are increased with increase in the potential of an interconnection point, a, between element Rs and resistor R2, and with decrease in the potential of an interconnection point, b, between element Rp and resistor R1, so that the voltage produced between the output terminals of the bridge circuit increases to a maximum value when an optimum degree of sharpness of the image is attained. The element Rp of $\gamma < 1$ may be replaced by an element Rs having identical characteristics thereto.

FIG. 5E illustrates a circuit comprising an element Rs connected to an input terminal of an operational amplifier AM, and an element Rp connected in the feedback network of the amplifier AM. When a voltage, +V, is applied to the input terminal, T-in, of the amplifier AM, an output voltage, Vo, appearing at its output terminal, T-out, may be expressed by the following formula $$V_o = - R_p/R_s \; V \qquad (6)$$

In the case of $\gamma > 1$ for element Rp, therefore, as the degree of sharpness of the image on each of the elements is increased, the resistance value of element Rs is increased, while the resistance value of element Rp is decreased, so that the ratio of Rp/Rs is decreased with decrease in the gain of the amplifier AM and with decrease in the output voltage, Vo. It follows that when an optimum degree of sharpness of the image is attained, the voltage Vo reaches a minimum value, thus it being made possible to detect an optimum degree of sharpness of the image.

Figure 5F:
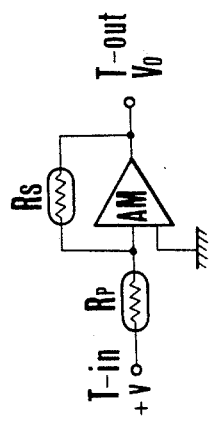

FIG. 5F illustrates a circuit of construction differing from that of FIG. 5E in the fact that the element Rp is connected to the input terminal, T-in, of the operational amplifier AM and the element Rs is connected in the feedback network of the amplifier AM. In this case, the output voltage Vo relative to an input voltage, +V, is expressed by the following formula $$V_o = - R_s/R_p \; V \qquad (7)$$

In the case of $\gamma > 1$ for element Rp, therefore, as the degree of sharpness of the image on each of the elements is increased, the ratio of Rs/Rp is increased to effect a reverse result to that of FIG. 5E.

FIG. 5G illustrates a circuit comprising elements Rp and Rs connected in respective feedback networks of operational amplifiers $AM_1$ and $AM_2$ cascade-connected to each other, and resistors R3 and R4 connected in respective input circuits of the amplifiers AM1 and AM2. In this case, the output voltage appearing at the output terminal, T-out, is varied, the voltage magnitude being dependent upon the ratio of the product of Rp and Rs to the product of R3 and R4. Therefore, in the case of $\gamma < 1$ for the element Rp, as the degree of sharpness of each of the images on the elements Rp and Rs, both the resistance values of elements Rs and Rp are increased with increase in the voltage of the output terminal, T-out, reaching a maximum value when an optimum degree of sharpness of the image is attained.

All of the circuits described above are accurately responsive to the output of each of the converter elements Rs and Rp. However, the responsibilities of elements Rs and Rp to equivalent illumination are largely different from each other due to the large difference in the geometry of the photoconductive cells as has been described in connection with FIGS. 1 and 5. With different illumination, it is difficult to avoid the production of different electrical responses of the photoconductive cells due to the difference in constant K and exponent $\gamma$, as is evident from equations (1) through (4). Consequently, these differences result in formation of an output in the circuit, while the degree of sharpness of the image is low. This output must be removed by the provision of optical means arranged between the elements Rs and Rp, or otherwise it acts as a noise in sensing the sharpness of the image, thereby the accuracy of the operation of the circuit in detecting an optimum degree of sharpness of the image is reduced to a considerable extent.

The present invention provides such optical means arranged between the series type and parallel type converters to remove the above-mentioned noise output. Various arrangements of such optical means adapted for combination with the series type and parallel type converters in accordance with the invention are illustrated in FIGS. 6 through 11.

Figure 6A:
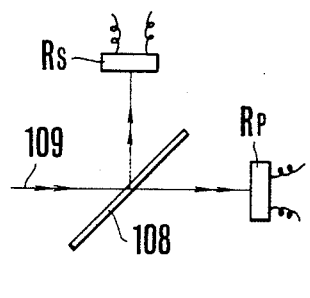
FIGS. 6(a), 6(b) and 6(c) are schematic elevational views of various arrangements of the photoconductive cells of FIGS. 4A and 4B.
Figure 6B:
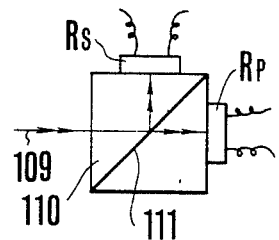
Figure 6C:
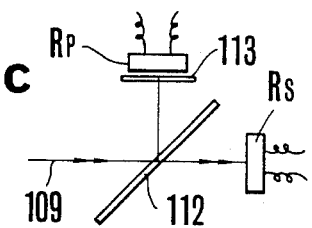

FIG. 6A illustrates an arrangement comprising a half mirror 108 arranged in the path of an image-forming light beam 109 to split the beam into two portions in a certain intensity ratio, and elements Rs and Rp arranged in the paths of the reflected and transmitted beam portions respectively and spaced from the mirror 108 by equal optical distances to each other. The intensity ratio may be determined by taking into account the ratio of the resistance values of element Rs to element Rp, these resistance values being independent of the light distribution of the image. For example, a half mirror having a reflectance of 80% and a transmittance of 20% may be employed so that the element Rs is exposed to the image-forming light of an intensity four times larger than that of the light impinging on the element Rp, thereby the resistance value of element Rs is decreased in a far larger proportion to a decrease of the resistance value of element Rp, so that the difference between the resistance values of the elements Rs and Rp is decreased to decrease the above-mentioned noise output. FIG. 6B illustrates an arrangement employing diagonal cube section 110 with a partially mirrored surface 111 formed on either of the diagonal faces of the cube sections instead of using the half mirror 108. The partially mirrored surface may have a reflectance of 80% and a transmittance of 20%. In this case, the same effect as above is produced in the cube 110. FIG. 6C illustrates an arrangement employing a half mirror in combination with a filter 113 arranged in front of element Rp to provide the same effect as above.

Figure 7A:
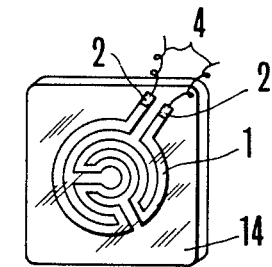
FIGS. 7(a) and 7(b) are enlarged perspective views of another practical example of the embodiment of the photoconductive cells adapted for assembly with each other in superimposed relation.
Figure 7B:
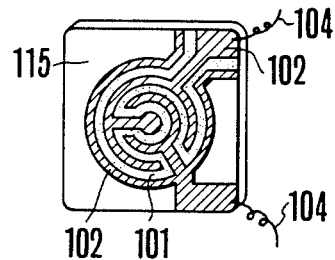
Figure 7C:
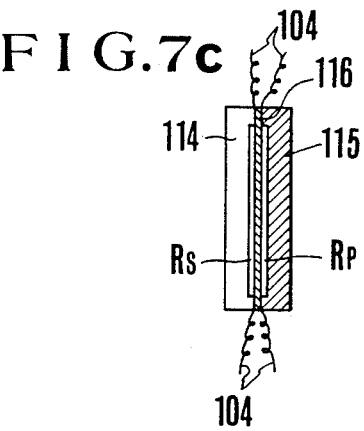
FIG. 7(c) is a sectional view of an assembly of the photoconductive cells of FIGS. 7(a) and 7(b).

FIG. 7 illustrates a method of assembling converters Rs and Rp with each other, the photoconductive cell in the converter Rs being mounted on a transparent insulated substrate 114 as shown in FIG. 7A, and the photoconductive cell in the converter Rp being constructed in such a manner that a photoconductive surface of the same geometry as shown in FIG. 4B is mounted on an opaque insulating substrate 115. The elements Rs and Rp are assembled as sandwiching a thin film filter 116 having a predetermined transmittance as shown in FIG. 7C. The converter assembly has an identical performance to that of the converter arrangements shown in FIG. 6, making it possible to remove the noise output independent of the sharpness of the image.

Figure 8A:
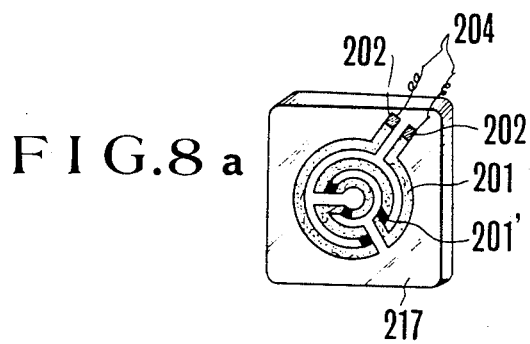
FIGS. 8(a) and 8(b) are enlarged perspective views of still another example of the embodiment of the photoconductive cells adapted for assembly with each other in superimposed relation.
Figure 8B:
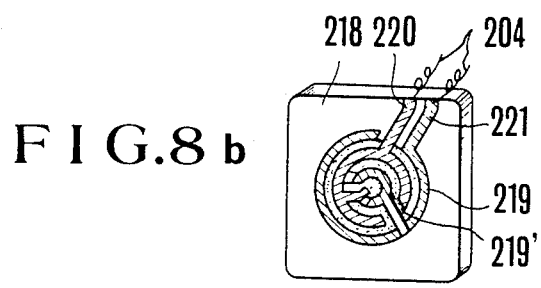
Figure 8C:
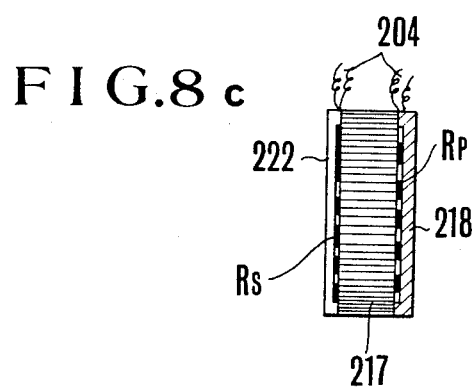
FIG. 8(c) is a sectional view of an assembly of the photoconductive cells of FIGS. 8(a) and 8(b).

FIG. 8 illustrates another method of assembling an converter Rs with an converter Rp. As shown in FIG. 8A, the converter Rs comprises a photoconductive cell 201 of an identical geometry to that in FIG. 4A mounted on a transparent optical fiber plate 217. As shown in FIG. 8B, the converter Rp comprises a photoconductive cell 219 mounted in an opaque insulating substrate 218 and first and second electrodes 220 and 221. The converters Rs and Rp are assembled in a manner as shown in FIG. 8C, and further the converter assembly is provided with an insulating transparent thin plate 222 mounted on the image-receiving surface of the converter Rs. The transmittance of the optical fiber plate 222 is suitably selected to produce the same effect as above. It is to be noted that, in this assembly, the photoconductive surfaces 201 and 219 of converters Rs and Rp are arranged in offset relation to each other. In other words, the shape and size of the photoconductive surface of converter Rp match those of the space surrounded by the photoconductive surface of the converter Rs, so that when the converters Rs and Rp are superimposed as shown in FIG. 8C, the photoconductive surfaces 210 and 219 are exposed to the image-forming light without the photoconductive surface 219 of the converter Rp being affected by the shadow of the photoconductive layer of the converter Rs, so that the image-forming light is effectively utilized. Further, in order to adjust the difference between the resistance values of converters Rs and Rp, there are provided a number of conducting portions 201' of small area arranged in the photoconductive layer 201 and a number of insulating portions 219' arranged in the photoconductive layer 219, thereby the conducting portions decreasing the resistance value of the converter Rs and the insulating portions increasing the resistance value of converter Rp, and thereby the difference between the resistance values of the converters Rs and Rp being adjusted to effectively remove the noise output in combination of the adjustment of the transmittance of the optical fiber plate 217. If necessary, a filter having a desired predetermined transmittance may be selected for employment in front of the converter Rp.

FIG. 9 illustrates another example of the series type converter and the parallel type converter suitable for use in the image sharpness detecting system in accordance with the present invention. FIG. 9A illustrates a series type converter comprising a photoconductive surface 301 of a geometry such that three concentric equally-spaced rings of equal width from each other are interconnected with each other at suitable positions to form a single current path with the photoconductive surface, and a pair of electrodes 302 contacting the respective ends of the current path and to which respective leads 304 are connected, the parts 301 and 302 being mounted on an insulating transparent substrate 307. FIG. 9B illustrates a parallel type converter comprising a photoconductive surface 301 of an identical geometry to that of FIG. 9A and a pair of electrodes 302 arranged along the current path and to which respective leads 304 are connected, the parts 301 and 302 being mounted on an insulating transparent substrate 307. The current paths of the photoconductive surfaces 310 shown in FIGS. 9A and 9B are identical in fundamental construction to those shown in FIG. 8.

FIG. 10 illustrates three examples of the mounting of a series type and parallel type converters shown in FIG. 9 in as small a space as possible within an air-tight housing composed of a transparent front plate and an opaque casing provided with electric conducting members mounted therein. FIG. 10A illustrates a unit comprising a series type or parallel type converter 308 shown in FIG. 9 mounted on the inside surface of a transparent front cover 307 of the casing 309 made of opaque material. The casing 309 is provided with a projection 309' for position adjustment or for attachment to an external support therefor. Such a projection may be provided on a portion of the transparent cover 307. The casing 309 is provided with electrical conductor rods 310 fixedly mounted therein for connection to the respective leads 304 of the converter 308. FIG. 10B illustrates another unit comprising a converter 308 shown in FIG. 9 mounted on an electrical conducting support rods 310 and a housing composed of a transparent front plate 307 and an opaque casing 309, the converter 308 and its supports are positioned in a space within the housing. The housing is provided with a projection for position adjustment, or for attachment to an external support therefor. FIG. 10C illustrates still another unit comprising series type and parallel type converters 308 mounted on the rear and side faces of diagonal cube sections 312a and 312b with diagonal faces 315 having a predetermined transmittance or reflectance. The cube is mounted behind a transparent portion provided in the front surface of an air-tight housing 309 made of an opaque material. A detector circuit 312 also is mounted in a space within the housing and has four input terminals to which the respective leads 304 of the converters 308 are connected and four output terminals 310 provided through the wall of the housing. In order to shield the converter 308 and the detector circuit 312 from electrostatic and magnetic influences, the housing is provided with a shield cover 313 earthed by a wire 314.

FIG. 11 illustrates an image sharpness detecting apparatus comprising a unit shown in FIG. 10C arranged to receive an image-forming light beam which is focused on the photoconductive surfaces of the converters Rs and Rp by a lens 316 arranged to be movable in a direction indicated by an arrow 317, so that upon movement of the lens 316, the degree of sharpness of the image formed on the photoconductive surfaces is varied. The converters are energized by a battery 319 and their outputs are indicated by an electrical indicating instrument 320. The indicator 320 may be replaced by a control apparatus for controlling a reversible motor of which the output is utilized to move the lens 317 along the optical axis thereof. The control apparatus may include an amplifier circuit and differentiation circuit by which the output of the image sharpness detecting circuit 312 is amplified and differentiated to control the amount of rotation of the motor, thereby the automatic focus adjustment is effected.

Figure 12:
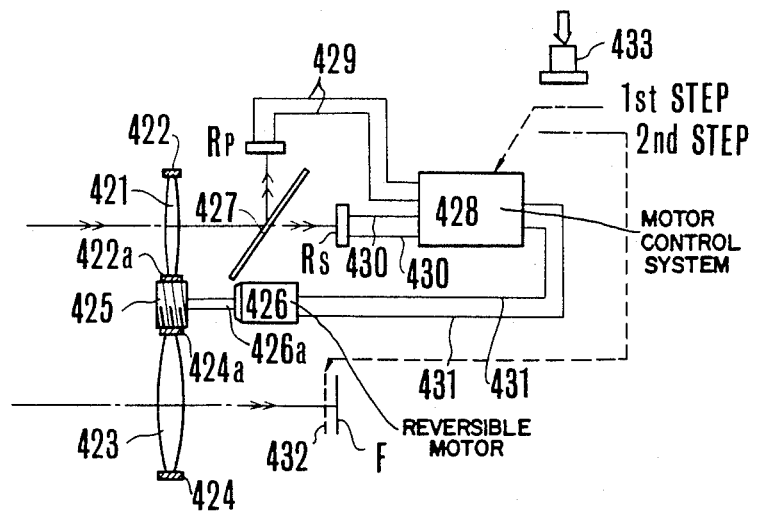
FIG. 12 is a schematic partly sectional, partly elevational view of an automatic focus adjustment mechanism of a photographic camera utilizing the image sharpness detecting system of the invention.
Figure 13:
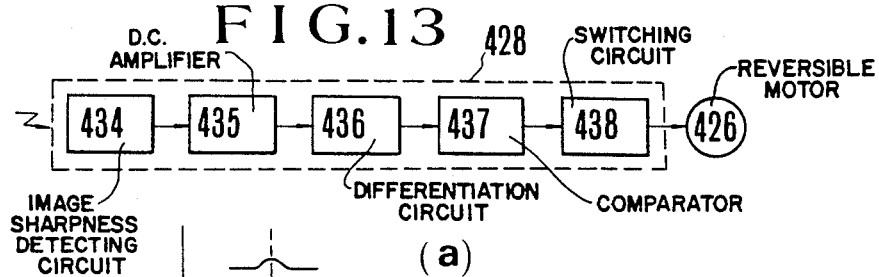
FIG. 13 is a block diagram of a motor control system for use in the mechanism of FIG. 12.

FIG. 12 illustrates schematically an arrangement of the basic parts of an automatic focus adjusting system adapted for use in a camera as comprising an image sharpness detecting apparatus employing any one of the circuits shown in FIGS. 5A through 5G, a lens 421 cooperating with the image sharpness detecting apparatus and supported in a barrel 422, and a photographing objective 423 supported in a barrel 424, the lens barrels 422 and 424 being provided with respective racks 422a and 424a formed therein and arranged to engage with a common worm gear 425 connected to the output shaft 426a of a reversible motor 426, so that upon rotation of the motor 426, the lens 421 and the objective 423 are driven for simultaneous movement in the same direction through equal distances. Positioned behind the lens 421 is a half mirror 417 in the path of an image-forming light beam entering through the lens 421 so that the beam is splitted into two portions in a certain light intensity ratio. A pair of series type and parallel type converters Rp and Rs are arranged respectively to receive the reflected beam portion and transmitted beam portion at positions coinciding with and optically equivalent to, or in respective near fields of the focus of the lens 421, thereby similar images of the same object are formed on the photoconductive surfaces of the converters Rp and Rs. The ratio of transmittance to reflectance of the half mirror 427 tilted with respect to the optical axis of the lens 421 is preferably such that the converters Rs and Rp, when exposed to the images of the same total light intensity, exhibit identical light response characteristics. The outputs of the converters Rs and Rp are connected by respective leads 410 and 429 to an image sharpness detecting circuit shown in FIGS. 5A through 5G and which constitutes part of a motor control system 428. The film plane on which an image is to be sharply focused by the objective 423 is indicated at F, and a shutter 432 associated with a two-step shutter release button 433 is positioned in front of the film plane F. The motor control system is illustrated in FIG. 13 as comprising an image sharpness detecting circuit 434, direct current amplifier 435, a differentiation circuit 436, a comparator 437 and a switching circuit 438, the switching circuit 438 having output terminals connected to the input of the motor 426.

Figure 14:
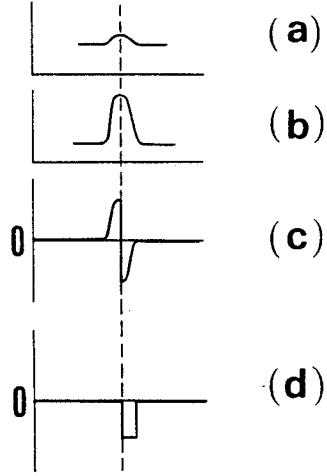
FIG. 14 is a graph illustrating timing variations of outputs of certain blocks of FIG. 13.

The operation of the automatic focus adjusting apparatus shown in FIG. 12 will be explained by reference to FIG. 14, wherein FIGS. 14(a) through 14(d) illustrates variations of the outputs of the blocks 432, 435, 436 and 437 respectively, the motor control system being enclosed by the dashed lines in FIG. 13. When the camera operator aligns the camera with an object intended to be photographed and then depressed the two-step release button 433 by the first step, the motor control system is rendered operative, thereupon the motor 426 is driven into rotation in a direction to displace the photographing objective 423 and the lens 421 from positions where unsharp images are formed on the photoconductive surfaces and the film plane. As the lens and objectives are displaced, the output of the image sharpness detecting circuit 434 is varied with time abruptly at the point of sharp focus as shown in FIG. 14(a), wherein a peak value is produced when an optimum degree of sharpness of the image is attained. Responsive to such an output variation with time, the direct current amplifier produces an output which is varied with time as shown in FIG. 14(b) and which is a mere amplification of the output of the circuit 434. As the output of the amplifier approaches the peak value, the output of the differentiation circuit 436 is reversed in polarity in a very short time interval as passing through the point of zero potential. The reference voltage of the comparator 437 is set to zero, in this instance, so that at an instant the output of the differntiation circuit 436 reaches the zero voltage, in other words, at an instant the degree of sharpness of the images formed by the lens 421 on the photoconductive surfaces of converter Rs and Rp reaches the maximum (in this instant, of course, the degree of sharpness of the image formed on the film plane by the photographing objective reaches the maximum), a pulse is generated as shown FIG. 14(d). Upon advent of the pulse on the switching circuit 48a, the drive circuit of the motor 426 is instanteneously short-circuited to stop the rotation of the motor 426. After the operator is informed that the sharpest image is focused on the film plane, he may depressed the release button from the first step to the second step, thereupon the shutter mechanism is actuated for initiation of an exposure the film.

The present invention has been described in connection with specific examples of an embodiment of the image sharpness detecting system and its application to the automatic focus adjustment mechanism of a camera. However, the invention may be practiced or embodied in still other ways without departing from the spirit thereof. For example, an automatic diaphragm mechanism of conventional construction may be selected for employment in front of the image-forming optical system cooperating the image sharpness detecting apparatus thereby the total light intensity on the photoconductive surfaces of the converters Rs and Rp is maintained constant at a desired level so that the motor control circuit is operated with improved stability.

Thus it will be seen from the foregoing description that the invention contemplates the use of a pair of photoconductive cells of different light response characteristics based on the different geometry thereof in combination with optical means such as beam-splitter and filter for compensating the difference between the characteristics of the cells to thereby providing an electric signal representing an optimum degree of sharpness of an image projected on the surface of the photoconductive cells from an object of any light distribution by an image-forming optical system cooperating with the image sharpness detecting apparatus, and therefore, the electrical signal can be utilized to automatically adjust the focus of an optical instrument accurately and reliably despite of the fact that most of the objects which may be usually encountered each are composed of complicated brightness patterns.

Further the present invention contemplates to mount as a unit the photoconductive cells which have high sensitivities to the change in light distribution of the image and which are suited for use in the image sharpness detecting apparatus within an air-tight housing provided with shield means for shielding the external electrostatic and magnetic influences to stabilize the operation of the photoconductive cells, thus it being made possible to use the image sharpness detecting apparatus in application requiring severe management.

What is claimed is:

1. An image sharpness detecting system cooperating with an image-forming optical system to detect an optimum degree of sharpness of an image projected thereby from an object comprising:
    light-to-electrical signal converting means positioned at a point of substantial focus of said optical system;
    detecting means connected to the output of said light-to-electrical signal converting means upon variation of the electrical output signal for detecting an optimum degree of sharpness of an image of the object;
    said light-to-electrical signal converting means including:
    first photoconductive means having an electrical characteristic associated therewith, said means having at least a pair of electrodes and a photoconductive element of such a geometry as to establish a current path of wide width and short length with the photoconductive material sandwiched in between said electrodes along the respective entire wide widths of said element,
    second conductive means having an electrical characteristic associated therewith, said means having at least a pair of electrodes and a photoconductive element of such a geometry as to establish a current path of narrow width and long length with the photoconductive material sandwiched in between said electrodes along the respective entire narrow widths of said element; said electrical characteristic of both first and second photoconductive means having a peak value when the sharpness of the image to be formed thereon becomes maximum; and
    optical means arranged between said first and second photoconductive means for adjusting the ratio of total incident light intensities on the surface of said two means so as to compensate for differences between the resulting lightresponsive characteristics of said first and second photoconductive means, whereby the optimum degree of sharpness of the image of the object which may be encountered can be detected with high accuracy even at low light levels.

2. An image sharpness detecting system according to claim 1, wherein said optical means includes an optical element having a partially light-permeable surface disposed between said first and second photoconductive means in a manner to act as a beam splitter.

3. An image sharpness detecting system according to claim 2, wherein said optical element is constructed in the form of a prism having two side faces on which said first and second photoconductive means are respectively mounted.

4. An image sharpness detecting system according to claim 2, wherein said light-to-electric signal converting means is mounted in a space within a shield housing having only one transparent portion at the front surface thereof arranged on the optical axis of said image-forming optical system so that said light-to-electric signal converting means receives the image-forming light beam through said transparent portion.

5. An image sharpness detecting system according to claim 2, wherein said optical element is so arranged and oriented as to reflect a portion of the image-forming light beam to the second photoconductive means and to transmit the other portion thereof to the first photoconductive means.

6. An image sharpness detecting system according to claim 2, wherein said optical element is constructed in the form of a light-splitting prism.

7. An image sharpness detecting system according to claim 1, wherein said optical means includes a glass fiber assembly.

8. An image sharpness detecting system according to claim 2, wherein said partially light-permeable surface has substantially different reflectance and transmittance coefficients from each other.

9. An image sharpness detecting system cooperating with an image-forming optical system to detect an optimum degree of sharpness of an image projected thereby from an object comprising:
    light-to-electrical signal converting means positioned at respective points of substantial focus of said optical system and
    detecting means connected to the output of said light-to-electrical signal converting means upon variation of the electrical output signal to detect an optimum degree of sharpness of an image of the objec;
    said light-to-electrical signal converting means including:
    first photoconductive means having an electrical characteristic, said means having a first photoconductive element of such a geometry as to establish a current path having shorter and longer sides, the length of the shorter sides being much shorter than the length of the longer sides and a pair of electrodes contacting the respective longer sides of said first photoconductive element along the entire length thereof, and
    second photoconductive means having an electrical characteristic, said means having a transparent substrate, a second photoconductive element formed thereon having shorter and longer sides, the length of the shorter side being extremely shorter than the longer sides, and a pair of electrodes contacting the respective shorter sides of said second photoconductive element along the entire length thereof, said electrical characteristic of both of said first and second photoconductive means has a peak value when the sharpness of the image to be formed thereon becomes maximum, said first pair of electrodes having an almost identical geometry with that of the second photoconductive element, and said first photoconductive means being arranged in the rear of said second photoconductive means so that said second photoconductive element is in alignment with the first pair of electrodes.

10. An image sharpness detecting system according to claim 9, wherein said second photoconductive element has such a geometry that a plurality of equally spaced rings of equal width are interconnected with each other at suitable positions to establish a single current path with the photoconductive material.

11. An image sharpness detecting system according to claim 9, including glass fiber bundle means arranged between said first and second photoconductive means.

12. An image sharpness detecting system according to claim 9, wherein said second photoconductive means is provided with intermediate electrodes for connection to said second photoconductive element thereof.

13. An image sharpness detecting system according to claim 11, wherein said first and second photoconductive means are mounted on the opposite side surfaces of said glass fiber bundle means to each other in face-to-face relation.

14. An image sharpness detecting system according to claim 9, wherein said first and second photoconductive elements each is made of photoconductive substance having non-linearity illumination versus resistance response characteristics.

15. An image sharpness detecting system according to claim 9, wherein said first photoconductive means is provided with light-restricting means.

16. An image sharpness detecting system according to claim 15, wherein said light-restricting means is a filter, and said first and second photoconductive means are assembled in unison as intervening said filter.

* * * * *

UNITED STATES PATENT OFFICE
CERTIFICATE OF CORRECTION

Patent No. 3,961,178  Dated June 1, 1976

Inventor(s) Kazuya Hosoe et al

It is certified that error appears in the above-identified patent and that said Letters Patent are hereby corrected as shown below:

In the heading of the Patent [30] should read as follows:

--[30]  Foreign Application Priority Data

Oct. 23, 1973  Japan..........48-119281
       Oct. 25, 1973  Japan..........48-120220
       Oct. 25, 1973  Japan..........48-120221--.

Signed and Sealed this

Twenty-sixth Day of October 1976

[SEAL]

Attest:

RUTH C. MASON  
*Attesting Officer*

C. MARSHALL DANN  
*Commissioner of Patents and Trademarks*